United States Patent [19]

Youcef-Toumi et al.

[11] Patent Number: 4,761,588
[45] Date of Patent: Aug. 2, 1988

[54] DUAL-DRIVE SYSTEM FOR MICRO-MANIPULATION OF DIRECT-DRIVE ROBOTIC SYSTEMS

[75] Inventors: Kamal Youcef-Toumi; Paul I. H. Ro, both of Cambridge, Mass.

[73] Assignee: MIT, Cambridge, Mass.

[21] Appl. No.: 938,533

[22] Filed: Dec. 5, 1986

[51] Int. Cl.$^4$ .......................................... H02P 7/68
[52] U.S. Cl. ................................................ 318/46
[58] Field of Search ............. 318/45, 46, 47, 48, 318/568 G, 568 H, 568 M, 40; 901/19, 23, 24, 38, 45, 50

[56] References Cited

U.S. PATENT DOCUMENTS

| | | | |
|---|---|---|---|
| 3,434,025 | 3/1969 | Parkinson et al. | 318/8 |
| 3,497,778 | 2/1970 | Gerber | 318/46 X |
| 3,833,847 | 9/1974 | Kelling | 318/630 |
| 4,126,818 | 11/1978 | Taylor | 318/46 |
| 4,131,827 | 12/1978 | Larrabee | 318/46 |
| 4,319,864 | 3/1982 | Kaufeldt | 318/163 X |
| 4,425,818 | 1/1984 | Asada et al. | 310/112 X |

FOREIGN PATENT DOCUMENTS

| | | | |
|---|---|---|---|
| 2851958 | 6/1979 | Fed. Rep. of Germany | 901/23 |
| 53-85051 | 7/1978 | Japan | 901/23 |
| 2102590 | 2/1983 | United Kingdom | 901/23 |
| 0552183 | 7/1977 | U.S.S.R. | 901/23 |
| 1198734 | 12/1985 | U.S.S.R. | 318/45 |

*Primary Examiner*—Bentsu Ro
*Attorney, Agent, or Firm*—Lorusso & Loud

[57] ABSTRACT

A dual-drive system compensates for the effects of drive system nonlinearities for micro-manipulation of direct-drive robotic systems. The dual-drive system uses two actuators to drive a single manipulator joint. The extra actuator compensates for undesirable effects of the nonlinearities in the drive system by providing a correctional biasing force such as torque to the primary actuator. In a preferred embodiment, both actuators are DC motors and the biasing torque is modulated by monitoring the current in the primary motor winding. This torque monitoring can also be achieved by direct measurement, such as using a strain sensing element. The dual-drive system is capable of eliminating the effects of electromagnetic hysteresis and other nonlinearities in the amplifier-motor portion of a direct-drive robot arm. This system can be used to improve not only positioning performance, but also the dynamic manipulation of a robot manipulator.

19 Claims, 3 Drawing Sheets

DUAL-DRIVE SYSTEM FOR MICRO-MANIPULATION OF DIRECT-DRIVE ROBOTIC SYSTEMS

BACKGROUND OF THE INVENTION

The present invention relates to a system for precise control over mechanical linkages, and more particularly to an apparatus for the micro-manipulation of links in a robotic system which overcomes the effects of simple and complex direct-drive nonlinearities.

Several manufacturing tasks require robots or hard-automated machines that are capable of very fine manipulations. In the assembly of optical fibers, for example, the required accuracy is on the order of 3 to 10 micrometers. Another application is in the assembly of magnetic cores for computers, where typical part dimensions are less than 1.0 millimeter and the assembly tolerancing error is on the order of 0.25 micrometer. Other recent applications such as integrated circuit manufacturing requires positioning stages with accuracies as low as 0.025 micrometer.

These applications require much higher precision in the design and control of robot manipulators than are currently available. The direct-drive approach in manipulator design has succeeded somewhat in improving the performance of robot manipulator systems by eliminating many problems inherent in gear systems, such as backlash, friction due to meshing, and mechanical compliance. Prior art direct-drive systems, however, exhibit some drawbacks. First, since the torque produced by the motor is used directly to drive the output link, the drive system must provide all of the necessary torque, requiring larger direct-drive motors and power amplifiers. Furthermore, having a one-to-one transmission ratio is disadvantageous in that disturbances and un-modelled dynamics of the manipulator arm are reflected onto the drive system shaft, making it difficult to control. Additional drawbacks that limit performance, particularly in micro-manipulation, are the nonlinearities in the amplifier-motor part of the drive system. Since no gear reducer is used, these system nonlinearities are transmitted directly to the output shaft and thereby interfere with accurate control.

The problem of compensating for nonlinearities has always been an important issue in control engineering. Most of the prior art solutions are based on control techniques such as adaptive control or nonlinear controller design using inverse describing functions. While such techniques may bring about solutions that deal with some of the more common nonlinearities, they are limited to controlling the electrical signal supplied to the direct-drive motor, rather than the motor torque output, and there still remain some problems associated with their implementation and effectiveness. In most cases an accurate and correct model of the nonlinearity is needed.

In general, drive system nonlinearities can be divided into two groups: simple nonlinearities and complex nonlinearities. Simple nonlinearities include single-valued, piece-wise linear nonlinearities such as dead band, coulomb friction, and preload. Complex nonlinearities include multi-valued nonlinearities such as backlash in a gear train or hysteresis in the electromagnetics of a motor. The existence of these nonlinearities, whether simple or complex, presents a serious control problem that can degrade both the transient and steady-state characteristics of system response.

Typically, in a robot manipulator drive system there are two major sources for both groups of nonlinearity, the actuator and the transmission. Transmission nonlinearities include compliance of a cable mechanism or spline in a harmonic drive, backlash, friction due to gear meshing, preload in bearings, etc. Also, various actuators have some inherent nonlinear characteristics such as medium compressibility in hydraulic or pneumatic systems, the dead band in power amplifiers, and hysteresis in the electromagnetics of an electric motor.

The transmission nonlinearities have been effectively compensated for in the prior art, using techniques such as spring-loaded antibacklash mechanisms resulting in "backlashless" gears. Unfortunately, these mechanisms also increase the friction considerably, making accurate manipulation difficult. Yet, to date there has been little or no effort in attempting to compensate for the nonlinear effects in actuator systems. The main reason for this is simply that there has not been a substantial need for it. The robots of the prior art have been applied generally to tasks that require only "moderate" precision, such as spray-painting, pick-and-place of low tolerance materials, and welding. However, as robots become applied to higher-precision manipulation tasks, undesirable behavior of actuator dynamics must be well compensated for.

Direct-drive actuator systems offer many advantages in precision applications over systems with gear trains or linkages, but three major nonlinearities associated with the motor-amplifier combination of a direct-drive system still remain: power stage electronics dead zone, torque ripple, and electromagnetic hysteresis.

The effect of power stage electronics dead zone appears in the output voltage of the amplifier. For a typical system, the dead zone may be as large as one volt in either direction. The large dead zone comes mainly from a time delay in switching the power transistors in the amplifier from positive to negative voltage output, and vice versa. The time delay is used to guarantee that the output voltage settles to zero before the next switching occurs.

Dead zone effect in the amplifier depends largely on the design of the particular amplifier. In some of the newer versions of power amplifiers, an output voltage bias is added to minimize these effects. Another prior art approach is use of feedforward compensation, which requires an accurate model of the nonlinearity. If an accurate model of dead zone can be obtained, such nonlinear compensation can greatly minimize the effect. However, one drawback of this method may be in actual implementation of such nonlinear controller, as an accurate model is difficult to obtain.

The second direct-drive nonlinearity is torque ripple which arises from variations in actual motor torque output as a function of the angle of the rotor. This can typically be mathematically modelled by a superposition of two different sinusoids. The period of the first sinusoid corresponds to the number of magnetic poles around the rotor. The second sinusoid is characterized by a period that corresponds to the number of conductors around the stator. Once the model is obtained, the feedforward compensation technique can be employed to minimize or eliminate such nonlinear effect. Both dead zone and torque ripple are simple nonlinearities which have been dealt with, to some extent, by the prior art.

Electromagnetic hysteresis exists in the motor-amplifier system, and is primarily a problem with permanent magnet DC motors which are widely used in direct-drive systems. There are three main sources that contribute to electromagnetic hysteresis nonlinearly in a DC motor. The first one is what is often referred to as iron core loss. The cross product of the permanent magnet field and the electric field in the winding is the torque produced by the motor. When the current in the winding is turned off, there is still a small amount of residual field in the same direction as the electric field. This arises due to the remaining field in the iron core after the current is turned off.

The second source is the eddy current effect in the winding. The third is a linear B-H relationship that exists in the air gap. When the air gap effect is combined with the nonlinear hysteretic effect from the iron core loss and the eddy current loss, a complex electromagnetic hysteresis results. Generally, the absolute width of the hysteresis is small, and this kind of complex nonlinearity has been neglected in the prior art for all practical purposes. However, it may have a significant effect when microrange fine manipulation is desired.

There is no known prior art actuator system that can completely eliminate the effect of a complex nonlinearity such as electromagnetic hysteresis. The nature of a complex nonlinearity is that there are two output values for any given input. This makes it very difficult for any conventional control action to fully eliminate its effect.

It is therefore a principal object of the present invention to provide a system which permits the micro-manipulation of robotic systems while overcoming complex nonlinearities such as electromagnetic hysteresis.

A further object of the present invention is to provide a robotic manipulation system which also overcomes simple nonlinearities such as torque ripple and dead zone effect.

Yet a further object is to provide a system that is relatively inexpensive and easy to construct.

Other objects will in part be apparent and in part pointed out hereinafter.

SUMMARY OF THE INVENTION

In the present invention, drive system nonlinearities are compensated for through use of two actuators to control a single joint or link, instead of a single actuator as in a conventional direct-drive system. The primary actuator is directly coupled to the link, and has sole control over the position of the link. The secondary actuator provides a necessary amount of active bias force such as torque to the primary actuator. Both actuators are connected through a coupling element which can be either rigid or compliant. In the case of a rigid coupling, the bias torque can be provided by monitoring the current in the primary motor via current monitor 24 of FIG. 1. When the coupling is compliant, the bias torque can be provided by closing a feedback loop around the torque measured at the coupling via fedback loop 25 of FIG. 1.

The dual-drive system may be employed for improving the static characteristics of a drive system such as positioning accuracy as well as the dynamic characteristics such as tracking accuracy and joint compliance control. The basic concept behind the present invention is in the use of an active bias force to "undo" any desirable changes in the system performance caused by the presence of nonlinearities. In this manner, nonlinearities are compensated for at the torque-level, rather than at the control level (either voltage or current) as is the case for all prior art compensation schemes. When the compensation is done at the torque-level, the appropriate amount of bias torque can be provided regardless of the types of nonlinearities. Once the desired torque is known, any deviation caused by the nonlinearities within the system, external disturbance, or due to nonlinear dynamic coupling with other systems can be directly compensated for at the torque-level by use of the secondary, biasing actuator.

The use of two motors is not, in itself, new. As early as 1920, a two-motor system was studied in depth for applications involving cranes. That two-motor system was mainly used for the purpose of sharing the load in hoisting operations or as a backup in case one motor failed to operate in a critical environment. More recent use of two-actuator systems has been in tendon-driven systems, (as opposed to directly-driven), that employ the antagonist drive concept. A prime example of an antagonist drive system is the MIT/UTAH hand. The hand uses 32 actuators to drive 16 individual joints in the hand, each joint employing an antagonist pair of pneumatic cylinders. The main purpose for the two-actuator system in this case is to control the compliance or joint torque independent of the other joints. Another example is used in the control of high-precision satellite antennas, which provide a bias torque in both directions by employing a twin motor system. This approach eliminates any play in the gearing system by mounting the second motor on the opposite side of the gear train as in other antagonist systems. In none of these cases, however, is the second actuator directly coupled to the primary actuator in order to overcome nonlinearities in the primary actuator, as in the present invention.

DETAILED DESCRIPTION OF THE PREFERRED EMBODIMENT

Figure 1:
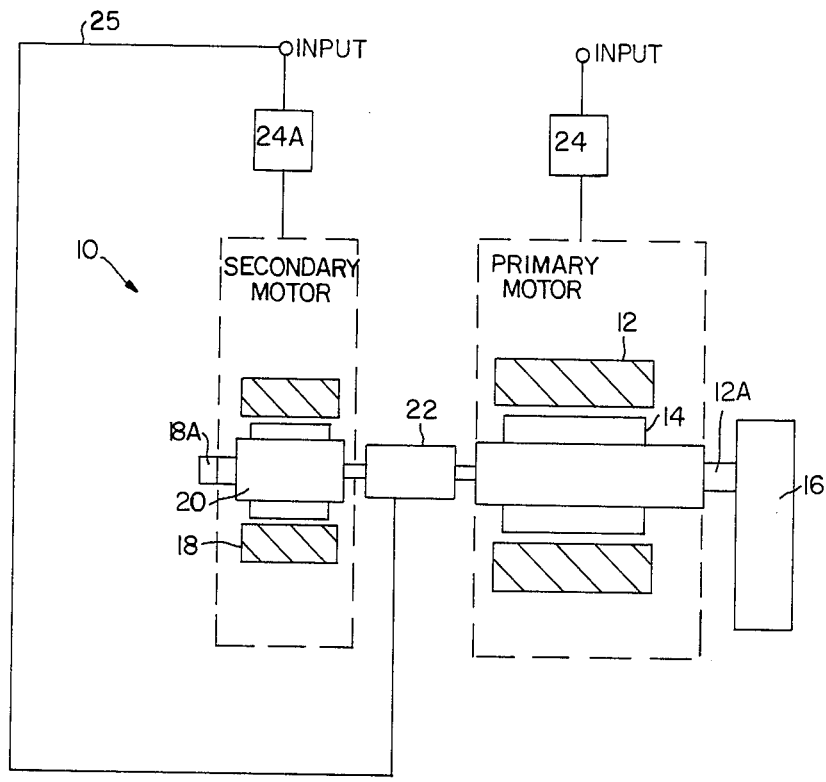
FIG. 1 is a schematic diagram of a dual-drive system in accordance with the present invention.

Referring to FIG. 1 there is a dual-drive system for micro-manipulation of direct-drive robotic systems 10. The term "dual" comes from the fact that two motors are used, instead of a single motor as in a conventional direct-drive system. A primary motor 12 includes a primary rotor 14 which is directly coupled to an output link 16, and has sole control over the position of the link via position sensor 12A. A secondary motor 18 including position sensor 18A provides active bias torque to the primary motor 12. The secondary motor 18 includes a secondary rotor 20 which is connected through a coupling element 22, which can be either rigid or compliant, to the primary rotor 14. As previously noted, the current monitor 24 monitors the current in the primary motor 12 to provide the bias torque where the coupling 22 is rigid. An example of a known monitor that could be used where the current is three phase can be found in the paper entitled "Joint Torque Measurement of a Direct-Drive Arm" by Asada, Youcef-Toumi and Lim, IEEE 23d Conference on Decision and Control, December 1984. With this type of monitor, currents are monitored through 0.01 ohm resistors and used in conjunction with position information and precalibrated torque constant parameters to provide an estimate of the torque. Other monitors are available for use depending on factors such as whether the current is three phase or single phase. Secondary motor 18 includes a similar current monitor 24A.

In the case where the coupling is compliant, a closed loop feedback 25 of the coupling torque can be obtained as shown in FIG. 1.

Figure 2:
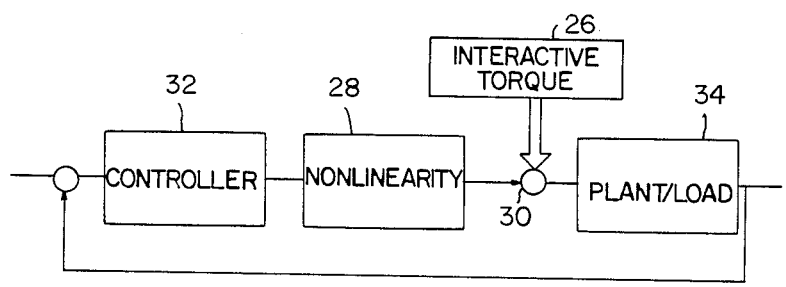
FIG. 2 is a schematic block diagram of a system which utilizes the interactive torque of a dual-drive micro-manipulation system in accordance with the present invention.

Referring now to FIG. 2 there is a simple block diagram model of a dual-drive system showing the location of an interactive torque 26 in relation to a nonlinear element 28. Nonlinearities 28 are located in the forward path prior to a torque junction 30. As is typically the case with complex nonlinearities such as electromagnetic hysteresis, the nonlinearity 28 is located after a motor controller 32 and before a plant or load 34. The interactive torque 26 is introduced at the output of the nonlinear element 28 by the secondary motor. This interactive torque has an analogous effect to a disturbance torque, and thus can be mathematically modelled as a disturbance torque. The only real difference is that the interactive torque is actively modulated to bring about necessary changes in the system behavior.

Torque modulation is one important aspect of the present invention in that compensation for nonlinearities depends on how well the bias torque is modulated. As used herein, torque modulation means how the bias torque varies as a function of time. Depending on the type of nonlinearities, the required interactive torque may simply be a constant, on-off switch type, a sinusoid, or a general function of time. For constant interactive torque, such as that which would compensate for a dead zone nonlinearity, the modulation is the simplest. In this case, the secondary motor operates at a prescribed value of interactive torque.

For a time-varying interactive torque, the modulation becomes more complicated. In such cases, the modulation will be based on the information about a particular model of nonlinearity and the system behavior. One simple example of the use of a time-varying interactive torque is the superposition of two sinusoids model which would compensate for torque ripple.

Additionally, a modulated interactive torque can be used to eliminate complex hysteretic effects. A system with a hysteresis nonlinearity exhibits a limit cycle behavior whose amplitude and frequency of oscillation are functions of the plant model and the nonlinearity. For hysteresis nonlinearity, there is no known conventional compensation scheme to eliminate limit cycle behavior. Using the dual-drive system of the present invention, the limit cycle behavior for a typical system has been completely eliminated. The torque modulation, in this case, was based on monitoring the winding current in the primary motor. The detailed modulation is shown in the graph of FIG. 3 for a known model of hysteresis of very small bandwidth.

Figure 3:
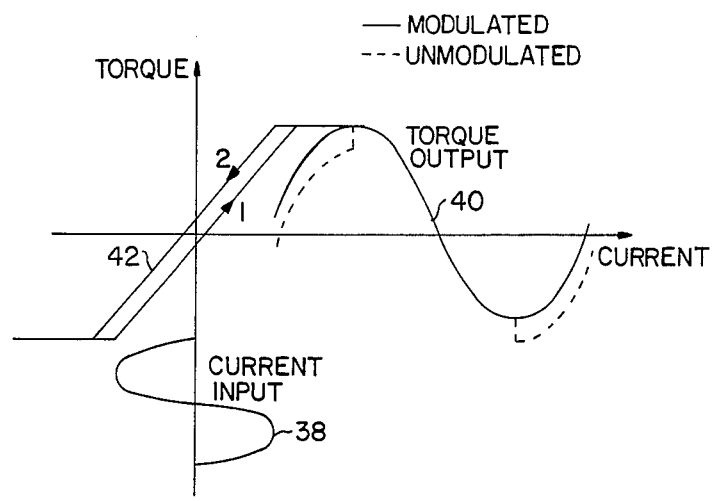
FIG. 3 is a graph depicting the torque response of a dual-drive system in accordance with the present invention modulated in response to variations in the current in the winding.

FIG. 3 presents a torque-current plot of this model of hysteresis. Curve 38 represents the current input to the primary motor, while curve 40 represents the modulated (solid line) and unmodulated (dashed line) output of the dual-drive system. Curve 42 represents the relationship between the current input and the torque output. In this example, the space between the two straight line paths of curve 42 represents the hysteresis in the model, which is known to be a small constant value when the current is increasing, and zero when the current is decreasing. It is this hysteresis which is to be compensated for by the interactive torque provided by the secondary motor.

Figure 4:
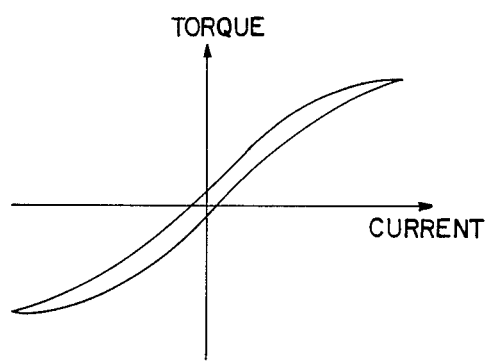
FIG. 4 is a graph depicting electromagnetic hysteresis in a typical DC electric motor.

The model of hysteresis depicted as curve 42 in FIG. 3 is a close simulation of the hysteresis observed in a typical DC electric motor, as can be seen from FIG. 4. As shown in FIG. 3, the interactive torque takes on a non-zero value depending on the rate of change of the current. In this case, the value of the interactive torque is:

$$T_i = \begin{bmatrix} T_b, \text{ for } dI/dt > 0 \\ 0, \text{ for } dI/dt < 0 \end{bmatrix}$$

where $T_i$ is the modulated interactive torque, $T_b$ is the known vertical width of the hysteresis, and I is the monitored current in the winding.

In effect, the modulated torque attempts to bring the hysteresis to zero by adding an appropriate amount of torque, as long as the current in the winding in the primary motor is increasing. For this model of the hysteresis, the unmodulated torque would rise along path 1 for increasing current, and fall along path 2 for decreasing current. By adding on the modulated interactive torque described in the equation above, the output torque rises and falls along one path, in this case, path 2.

Figure 5A:
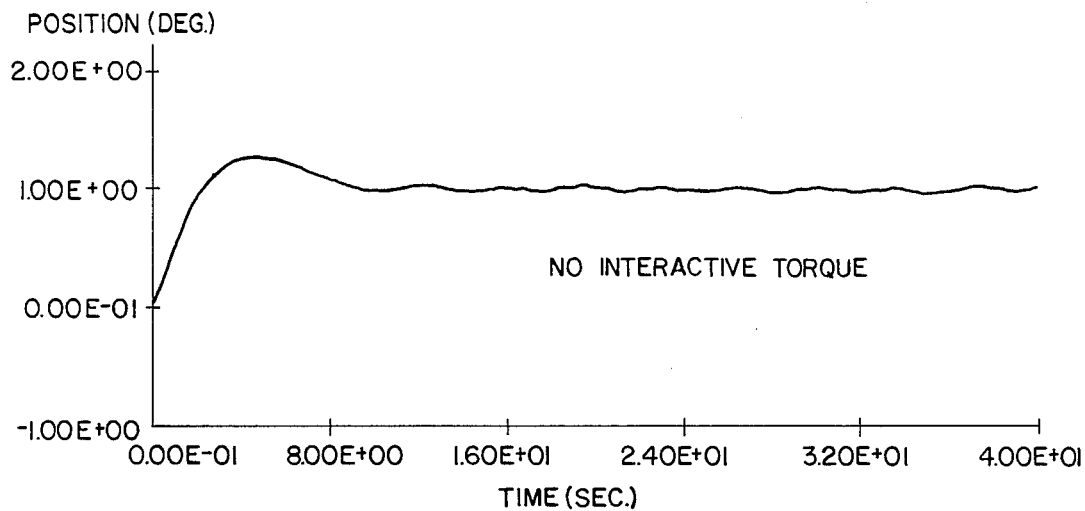
FIGS. 5a and 5b are graphs of experimental results of micro-manipulation positioning with a conventional single actuator direct-drive system, and a dual-drive system in accordance with the present invention, respectively.
Figure 5B:
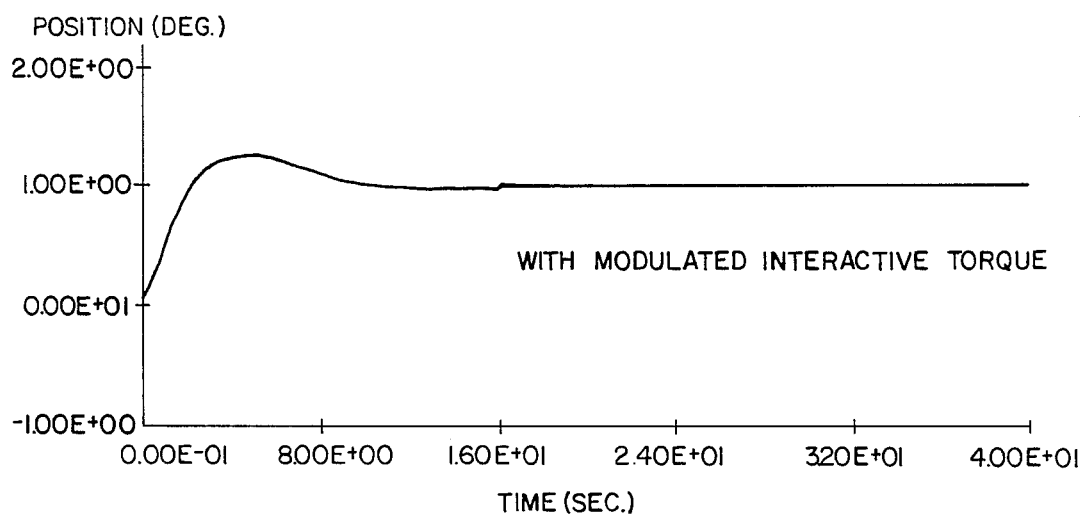

Modulated torque has been applied to a simple experimental second order system of the type shown in FIG. 2 with a PI (Proportional and Integral) controller under position control. The effect of hysteresis is shown as the steady-state limit cycle behavior in FIG. 5a, when no interactive torque is added. FIG. 5b shows the same system with the modulated interactive torque. In the second case, the limit cycle behavior is completely compensated for.

This example is for one particular type of modulation for hysteresis nonlinearity, namely, one for which the model of hysteresis is previously known. However, this does not have to be the case. For example, if the model can not be obtained exactly, or if there are combinations of nonlinearities such that the exact model is difficult to obtain, modulation of the interactive torque provided by the secondary motor can be determined by computing the necessary torque based on positional error. The positional error is the difference in angular position between the link and the secondary motor. Thus, in each case, the control strategy for the dual-drive system can be modified to fit a particular modulation scheme.

It is thus seen that the objects of this invention have been achieved and other advantageous results attained in that there has been disclosed a system which permits micro-manipulation of robotic systems while overcoming complex nonlinearities, which permits robotic manipulation while also overcoming simple nonlinearities, and which is inexpensive and easy to construct.

Although the dual-drive system of the present invention has been introduced mainly to improve steady-state accuracy of robot manipulator systems, the present invention can be extended to bring further improvements in other areas of robot applications. For example, a proper coordination of two motors acting against or for each other in transient mode may result in improved dynamic accuracy such as in trajectory following. Another possible application would be in the area of force/compliance control.

Various modifications of the present invention will become apparent to those skilled in the art from the foregoing description and accompanying drawings. Such modifications are intended to fall within the scope of the appended claims.

What is claimed is:

1. Apparatus for direct-drive micro-manipulation of a robotic system having a link, comprising:
   a primary DC electric motor having a primary rotor,
   means for directly coupling said primary rotor to the link,
   a secondary DC electric motor having a secondary rotor,
   means for coupling said secondary rotor to said primary rotor,
   means for driving said primary DC electrical motor in a first direction, and
   means for selectively modulating said secondary DC electric motor to apply a bias force to said primary DC electric motor.

2. The apparatus of claim 1 wherein said first direction is rotational.

3. The apparatus of claim 1 wherein said secondary to primary rotor coupling means is compliant.

4. The apparatus of claim 1 wherein said secondary to primary rotor coupling means is relatively rigid.

5. The apparatus of claim 4 wherein said modulating means includes means for monitoring changes in the electrical current in the winding of the primary motor, and wherein said modulating means causes said secondary motor to apply a bias force to said primary motor when the current is increasing.

6. The apparatus of claim 1 wherein said modulating means causes said secondary motor to apply a substantially constant bias force to said primary motor.

7. The apparatus of claim 1 wherein said modulating means causes said secondary motor to apply a time-varying bias force to said primary motor according to a predetermined time-dependent forcing function.

8. The apparatus of claim 1 wherein said modulating means includes means for sensing the position of the link, and wherein said modulating means causes said motor actuator to apply a bias force when the positon of the link does not coincide with the position of said secondary motor.

9. The apparatus of claim 1 wherein the capacity of said secondary motor is less than or equal to the capacitor of said primary motor.

10. A method for precisely manipulating a robotic system having a link, a primary DC electric motor having a primary rotor, and a secondary DC electric motor having a secondary rotor, comprising:
    coupling said primary rotor directly to the link,
    coupling said secondary rotor to said primary rotor,
    driving said primary motor in a first rotational direction, and
    modulating said secondary motor to selectively apply a bias torque to said primary motor.

11. The method of claim 10 wherein said bias torque has a substantially constant magnitude.

12. The method of claim 10 wherein said bias torque has a time-varying magnitude.

13. The method of claim 10 further comprising monitoring the electrical current in the winding of said primary motor, and wherein said bias torque is applied to said primary motor when the current is increasing.

14. The method of claim 10 further comprising sensing the position of the link, and wherein said bias torque is applied to said primary motor when the position of the link does not coincide with the position of said secondary motor.

15. In a direct-drive, micro-manipulation robotic system having a link, the drive system being of the type wherein a primary DC electric motor having a primary rotor is directly coupled to the link being micro-manipulated, the improvement comprising:
    a secondary DC electric motor having a secondary rotor directly coupled to the primary rotor, and
    means for selectively modulating said secondary motor to apply a bias torque to the primary motor.

16. The robotic system of claim 15 wherein said modulating means causes said secondary motor to apply a substantially constant bias torque to the primary motor.

17. The robotic system of claim 15 wherein said modulating means causes said secondary motor to apply a time-varying bias torque to the primary motor.

18. The robotic system of claim 15 wherein said modulating means includes means for monitoring changes in the electrical current in the winding of the primary motor, and wherein said modulating means causes said secondary motor to apply a bias torque to the primary motor when the current is increasing.

19. The robotic system of claim 15 wherein said modulating means includes means for sensing the position of the link, and wherein said modulating means causes said secondary motor to apply a bias torque to the primary motor when the position of the link does not coincide with the position of said secondary motor.

* * * * *

UNITED STATES PATENT AND TRADEMARK OFFICE
CERTIFICATE OF CORRECTION

PATENT NO.  : 4,761,588
DATED       : August 2, 1988
INVENTOR(S) : Youcef-Toumi et al.

It is certified that error appears in the above-identified patent and that said Letters Patent is hereby corrected as shown below:

Column 6, line 17: "As" should be indented.

Column 7, line 27: change "electrical" to "electric".

Column 7, line 56: insert "secondary" before "motor";

delete "actuator".

Signed and Sealed this

Fourth Day of April, 1989

Attest:

DONALD J. QUIGG

*Attesting Officer*

*Commissioner of Patents and Trademarks*